(12) United States Patent
Otsuka

(10) Patent No.: US 6,424,425 B1
(45) Date of Patent: Jul. 23, 2002

(54) FACSIMILE AND STORAGE MEDIUM

(75) Inventor: Shuji Otsuka, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 0 days.

(21) Appl. No.: 09/174,088

(22) Filed: Oct. 16, 1998

(30) Foreign Application Priority Data

Nov. 18, 1997 (JP) .............................. 9-335107

(51) Int. Cl.⁷ .............................. G06F 13/00; H04N 1/00
(52) U.S. Cl. ....................... 358/1.15; 358/407; 358/468; 709/239
(58) Field of Search ................................ 358/1.15, 402, 358/403, 407, 434, 442, 468; 709/238, 239, 240; 379/93.09, 93.24, 100.01, 100.08, 100.09, 100.12, 100.13, 100.15

(56) References Cited

U.S. PATENT DOCUMENTS

| | | | | |
|---|---|---|---|---|
| 5,369,686 A | * | 11/1994 | Dutra et al. | 379/93.24 |
| 5,659,164 A | * | 8/1997 | Schmid et al. | 235/375 |
| 5,805,298 A | | 9/1998 | Ho et al. | |
| 5,826,034 A | * | 10/1998 | Albal | 709/239 |
| 5,881,233 A | * | 3/1999 | Toyoda et al. | 709/233 |
| 6,005,677 A | * | 12/1999 | Suzuki | 358/442 |
| 6,025,931 A | * | 2/2000 | Bloomfield | 358/402 |
| 6,052,445 A | * | 4/2000 | Bashoura et al. | 379/100.14 |
| 6,058,169 A | * | 5/2000 | Bramnick et al. | 379/100.01 |

FOREIGN PATENT DOCUMENTS

| | | | |
|---|---|---|---|
| JP | 07288557 | 10/1995 | |
| JP | 07288634 | 10/1995 | |
| JP | 10-243019 | 9/1998 | |
| WO | WO 96/41463 | * 3/1997 | ............ H04N/1/00 |
| WO | WO 97/10668 | * 3/1997 | ............ H04N/1/00 |
| WO | WO 98/28892 | 7/1998 | |

* cited by examiner

*Primary Examiner*—Edward Coles
*Assistant Examiner*—Joseph R. Pokrzywa
(74) *Attorney, Agent, or Firm*—Oliff & Berridge, PLC

(57) ABSTRACT

The invention provides a facsimile which automatically switches communication networks depending upon the reading mode of the reading means for reading the image information of an original. Specifically, a facsimile is provided with reading means for reading the image information of an original and setting means for setting the reading mode of the reading means and which sends information read by the reading means via either the Internet or a public switched network. If a reading mode set by the setting means is a predetermined reading mode, switching means switches to sending the read information using the Internet.

19 Claims, 4 Drawing Sheets

FACSIMILE AND STORAGE MEDIUM

BACKGROUND OF THE INVENTION

1. Field of Invention

The invention relates to a facsimile for sending data read by an image scanner via either the Internet or a public switched network.

2. Description of Related Art

A facsimile that functions as a normal unit facsimile and as an image scanner for inputting to image information of an original document to a computer, are known. The reading resolution when such a facsimile is used as a unit facsimile is 400 dpi at a maximum even in a group-4 (G4) facsimile, while the reading resolution when such a facsimile is used for an image scanner is 2400 dpi at a maximum.

Therefore, data which an image scanner reads at the reading resolution of 600 dpi cannot be sent between facsimiles via a public switched network nor via the Internet, according to standard facsimile procedures.

In such a case, data read by the image scanner is stored in an image file, and the user switches from a communication network, such as a public switched network (not via the Internet) to another communication network, such as the Internet. The data stored in the image file is then sent with the data attached to an electronic mail.

A facsimile which reads a color original in a color mode is known. However, a situation where there are color facsimiles on both sending and receiving ends, is rare. Heretofore, first, a color original is read by an image scanner, read image data is once stored in an image file, the stored image file is sent via the Internet with the image file attached to an electronic mail, the sent image file is input to a computer on the receiving end and printed by a color printer connected to the computer.

However, in the above conventional type facsimile, every time a color original is sent, the setting of the reading resolution of the image scanner is required to be changed to high resolution and the communication network is required to be switched. Therefore, it is very troublesome to switch a communication network every time the setting of the reading mode of an image scanner is changed.

SUMMARY OF THE INVENTION

The invention provides a facsimile which automatically switches communication networks depending upon the reading mode of the reading means for reading the image information of an original.

Specifically, a facsimile is provided with reading means for reading the image information of an original and setting means for setting the reading mode of the reading means and which sends information read by the reading means via either the Internet or a public switched network. If a reading mode set by the setting means is a predetermined reading mode, switching means switches to sending the read information via the Internet.

Another aspect of the invention provides a function for sending an electronic mail via the Internet and storage means for storing at least one of a mail address for specifying the destination to which the electronic mail is sent and a facsimile number for specifying the destination to which read information is sent via a public switched network. Switching means is provided with determination means for determining whether the mail address of the destination is stored in the storage means if the destination is specified and switching to the Internet if it is determined by the determination means that the mail address is stored and further, the type of reading mode set by the setting means is a predetermined reading mode.

Other aspects of the invention include that the predetermined reading mode may be provided with a predetermined reading resolution, and that the predetermined reading mode may be a color reading mode.

Another aspect of the invention provides a storage medium with reading means for reading the image information of an original and setting means for setting the reading mode of the reading means. The storage medium stores a computer program for controlling a facsimile that sends information read by the reading means via either the Internet or a public switched network. If the reading mode set by the setting means is the predetermined reading mode, the storage medium stores a switching control program for switching to the Internet and other computer programs including a sending control program for control so that the read information is sent via the communication network switched by the switching control program.

According to the invention, the switching means switches to the Internet if the reading mode set by the setting means is a predetermined reading mode. Therefore, labor is saved every time the reading mode is automatically set to a predetermined reading mode.

Particularly, the switching means provided according to the invention is provided with determination means for determining whether the mail address of a destination is stored in the storage means if the destination is specified and switches to the Internet if it is determined by the determination means that the mail address is stored and further, the type of a reading mode set by the setting means is a predetermined reading mode.

That is, as a mail address based upon which an electronic mail is sent is required if read information is sent via the Internet, it is determined whether the mail address of a destination is stored in the storage means before it is determined whether the type of reading mode set by the setting means is a predetermined reading mode.

That is, because as read information cannot be sent via the public switched network if the set reading resolution is higher than reading resolution defined in facsimile communication, information read at the set reading resolution can be sent by switching to the Internet using the above switching means.

Further, the above reading mode may be a color reading mode if the image information is color. That is, information read in a color reading mode cannot be sent if the destination facsimile does not correspond to a color reading mode. However, read information can be sent to a computer and other devices at the destination by switching to the Internet using the above switching means.

The invention may also include a storage medium that if the reading mode set by the setting means is a predetermined reading mode, stores a switching control program for switching to the Internet, and other computer programs including a sending control program for providing control so that information read by the reading means via the communication network switched according to the switching control program.

That is, if a facsimile is connected to a computer and the operational environment of the facsimile can be controlled by the computer, control over switching the communication network and sending read information can be realized by downloading and executing the computer program stored in the storage medium.

As described above, according to the invention, labor for switching a communication network can be saved by automatically switching the communication network based upon the reading mode of the reading means for reading the image information of an original.

Particularly, according to the invention, the communication network can be automatically switched to the Internet, if it is determined that the type of a reading mode is a predetermined reading mode. Further, if it is determined that the mail address of a destination is stored in the storage means, read information can be sent via the Internet.

Control over switching the above communication network and sending read information can be realized by downloading and executing a computer program stored in a storage medium according to the invention.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

Figure 1:
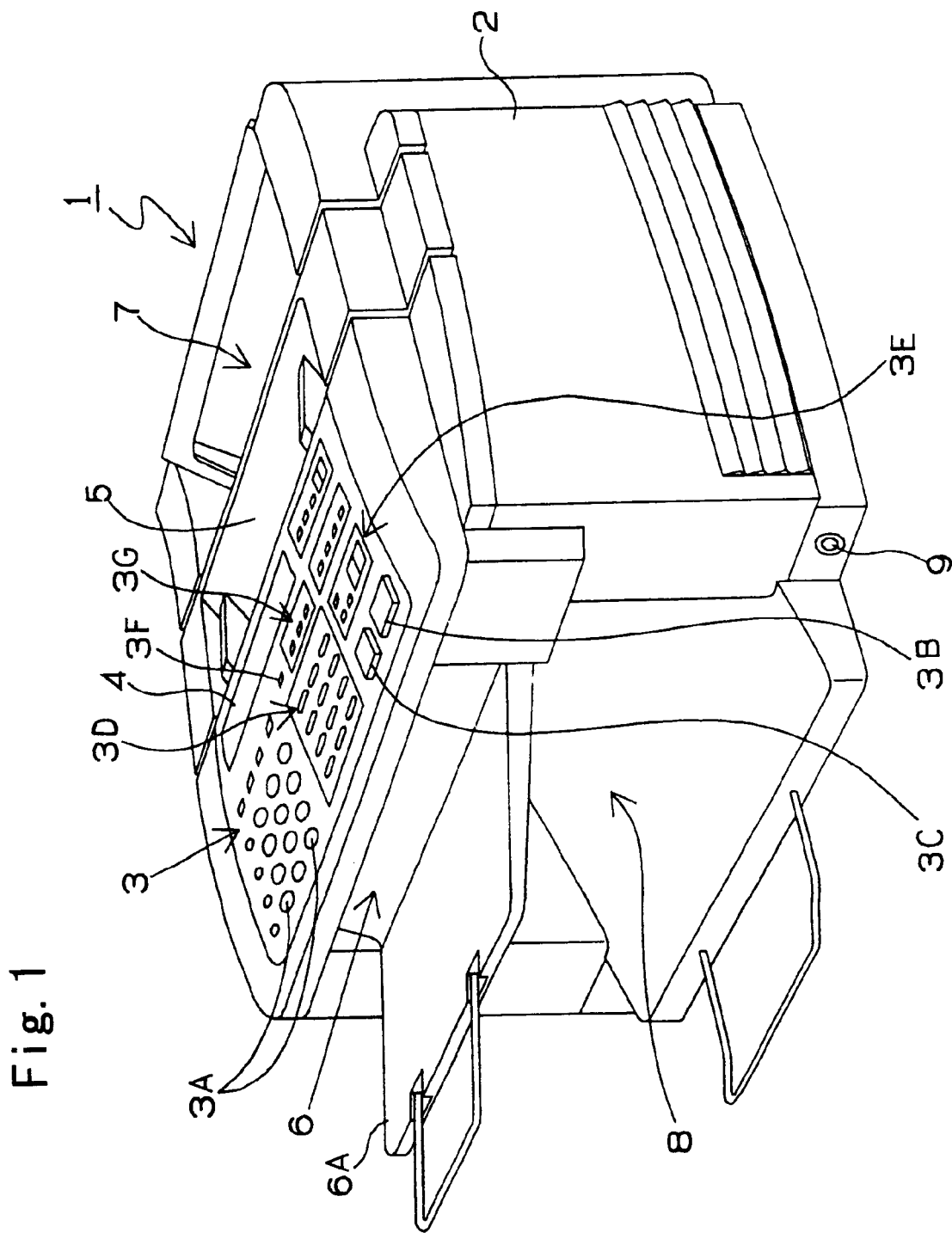
FIG. 1 is a drawing of a facsimile equivalent to an embodiment of the present invention.

Referring to the drawings, an embodiment of a facsimile according to the invention will be described below.

FIG. 1 is a drawing showing the appearance of a facsimile equivalent to the embodiment of the present invention. In the following embodiment, a facsimile of a multi-function type provided with plural functions, such as a facsimile function, an image scanner function, a printer function and a copy machine function, will be described on behalf of the facsimile.

The facsimile 1 includes a housing 2 in the shape of a box and a control panel 3 located in the front part of the upper surface of the housing 2. The control panel 3 includes ten keys 3a composed of 0 to 9 for inputting the facsimile number of a destination of read data, a start button 3b to start sending the read data, a stop button 3c to stop the sending of the read data, an abbreviated dialing button 3d for sending the read data using an abbreviated facsimile number, a switching button 3e for switching between a facsimile mode and a printer mode, a color reading mode button 3f for switching to a color reading mode for reading a color original, and a resolution setting button 3g for setting the reading resolution of an original.

The ten keys 3a may also include characters and symbols and may also be used for inputting mail addresses of electronic mail destinations.

A liquid crystal display (LCD) 4 for displaying the mail address, the facsimile number of a destination, sending status, etc. is provided in the read portion of the control panel 3 and an original setting tray 5 for setting an original to be sent and/or copied is provided at the back of the liquid crystal display 4. An original set in the original setting tray 5 is carried inside the housing 2 by a paper feed mechanism (not shown) provided inside the housing 2 and the image information of the carried original is read by an image scanner 19 in FIG. 3. The read original is ejected on a tray 6a via an original exit 6 provided below the control panel 3 so that originals can be stacked.

A recording paper setting tray 7 for setting recording paper which is a recording medium for recording received read data and print data, is provided at the back of the original setting tray 5. A recording paper cassette (not shown) for holding a plurality of recording paper to be stacked, may be attached to the recording paper setting tray 7. Recording paper housed in the recording paper cassette is carried inside the housing 2 by the above-mentioned paper feed mechanism and ink is jetted on the carried recording paper by an ink-jet printer 26 shown in FIG. 3. The recorded recording paper is ejected from a recording paper ejecting tray 8 provided under the tray 6a.

A video signal input terminal 9 is provided in the right lower part of the front of the housing 2. A video signal output from a video camera, and the like, can be connected to the video signal input terminal 9. Video images and the like, may be printed by the ink-jet printer 26 in FIG. 3.

A communication terminal (not shown) for connecting a public telephone line 52 in FIG. 3 and a terminal (not shown) for connecting a coupling cable 54 in FIG. 3 for connecting to a personal computer 53 in FIG. 3 (hereinafter called PC) are provided at the back of the housing 2 and a telephone receiver for calling a destination is provided on the left side.

An image scanner 19 is equivalent to reading means, and a color reading mode button 3f and a resolution setting button 3g are equivalent to setting means.

Figure 2:
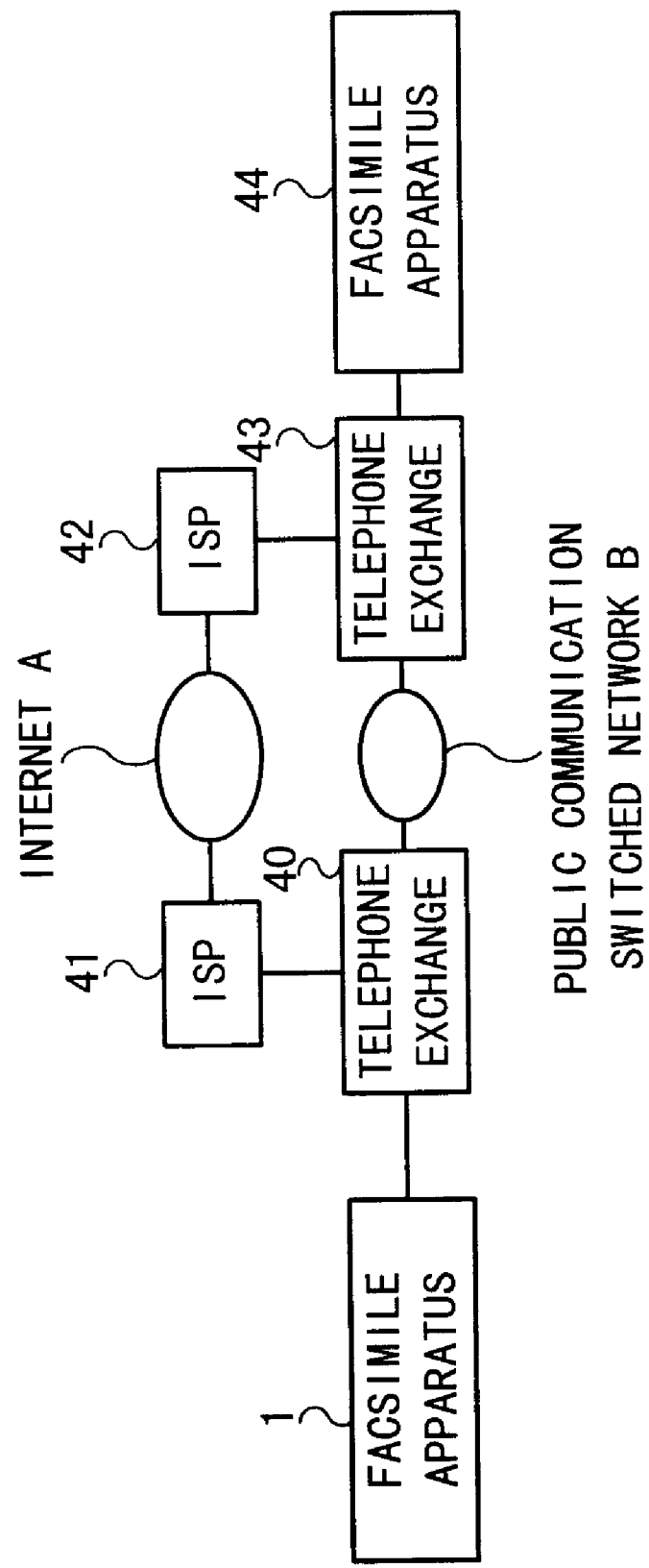
FIG. 2 is a drawing showing the configuration of a telecommunication system connecting facsimiles.

FIG. 2 is a block diagram of a telecommunication system connecting facsimiles. The facsimile 1 is connected to a switching system 40 installed in an area in which the facsimile 1 is provided via a telephone line 52. The switching system 40 is also connected to the Internet A via an Internet service provider (ISP) 41. A destination facsimile 44 is provided with a function for sending/receiving read data via the Internet A or a public switched network B, is connected to a switching system 43 installed in an area in which a destination facsimile 44 is provided. The switching system 43 is also connected to the Internet A via ISP 42.

That is, the facsimile 1 is connected to the destination facsimile 44 via a communication network including the Internet A, such as the switching system 40, ISP 41, the Internet A, ISP 42 and the switching system 43.

The facsimile 1 is also connected to the destination facsimile 44 via a communication network including the public switched network B, such as the switching system 40, the public switched network B and the switching system 43.

Figure 3:
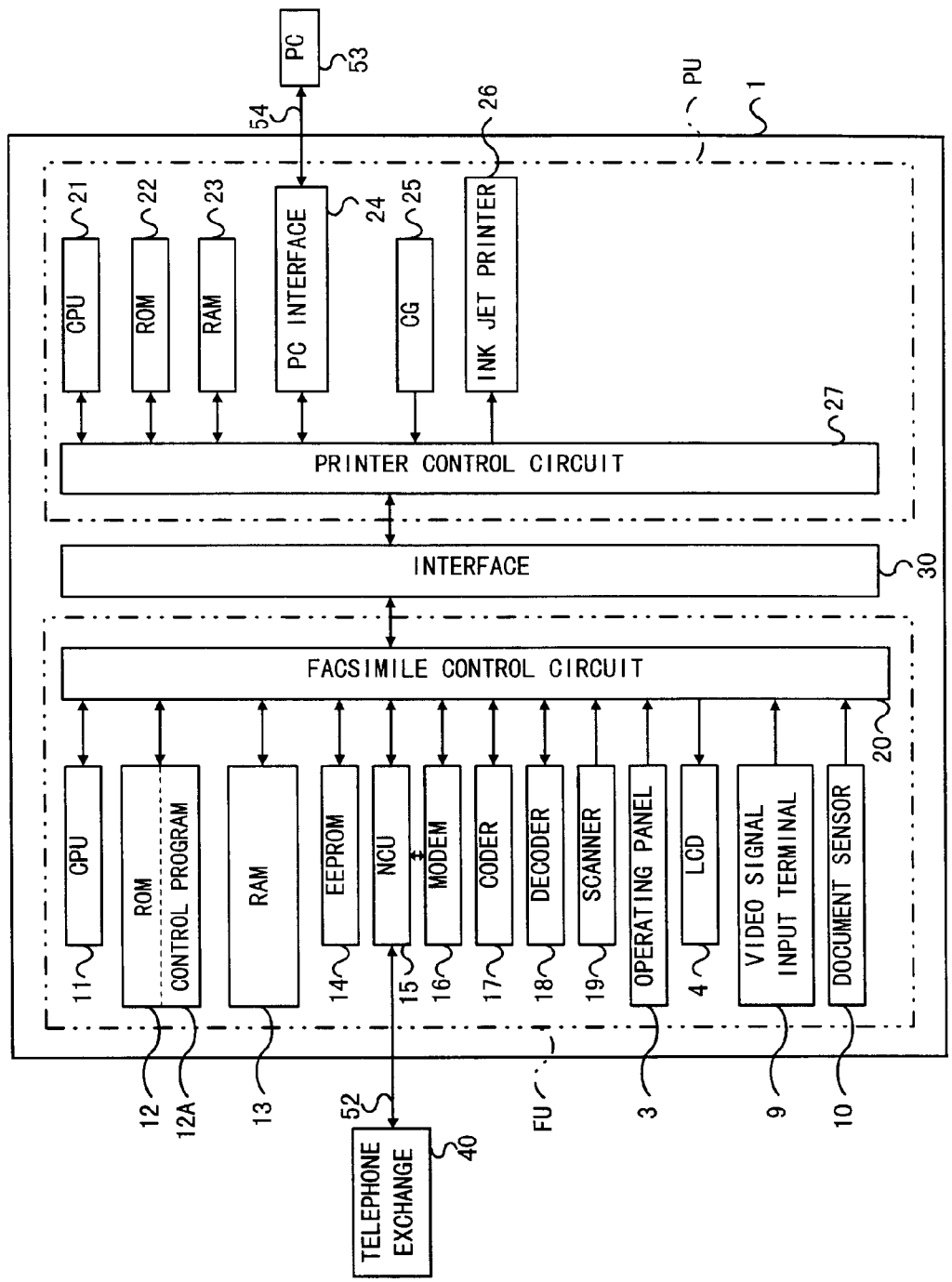
FIG. 3 is a block diagram of the facsimile shown in FIG. 1.

FIG. 3 is a block diagram of the facsimile 1 shown in FIG. 1. The facsimile 1 is provided with a facsimile unit FU and a printer unit PU which are connected via an interface 30.

The facsimile unit FU is provided with CPU 11 for controlling switching of a communication network between either the Internet A or the public switched network B. The facsimile unit FU also controls sending/receiving read data. CPU 11, ROM 12, RAM 13 and EEPROM 14 are connected to the facsimile control circuit 20. A control program 12a used by CPU 11 to execute various control functions, is stored in ROM 12. Facsimile numbers and mail addresses input from keys 3a, the read data from the image scanner 19, and the like, are temporarily stored in RAM 13.

EEPROM 14 stores mail addresses and facsimile numbers related to destinations. While this data is erasable, it is stored after the facsimile 1 is powered off.

The facsimile 1 is also provided with NCU 15 for sending a dialing signal to the telephone line 52 and responding to a call signal from the telephone line 52. A modem 16 for sending/receiving read data, is also connected to NCU 15. Further, an encoder 17 that converts read data read by the image scanner 19, and the like, to compressed data, a decoder 18 that decodes encoded data, such as received read data, and an original sensor 10 that detects when an original is set in the original setting tray 5, are connected to the facsimile control circuit 20.

The printer unit PU is provided with a printer control circuit 27 for controlling an ink-jet printer 26. The CPU 21 which executes the program to control the ink-jet printer 26, is also connected to the printer control circuit 27. ROM 22 in which programs executed by CPU 21, and the like, are stored, RAM 23 which includes a working memory used when CPU 21 executes a program, a print memory for storing data for printing, and the like, an interface 24 to which PC 53 is connected, a character generator (CG) 25 in which vector fonts, such as a character for printing are stored and the ink-jet printer 26 for jetting an ink droplet onto a recording paper for printing, are connected to the printer control circuit 27.

In this embodiment, the interface 24 for PC 53 is a parallel interface according to Centronics Standard and the facsimile 1 sends or receives data to/from PC 53 via a cable 54 connected to the interface 24.

Figure 4:
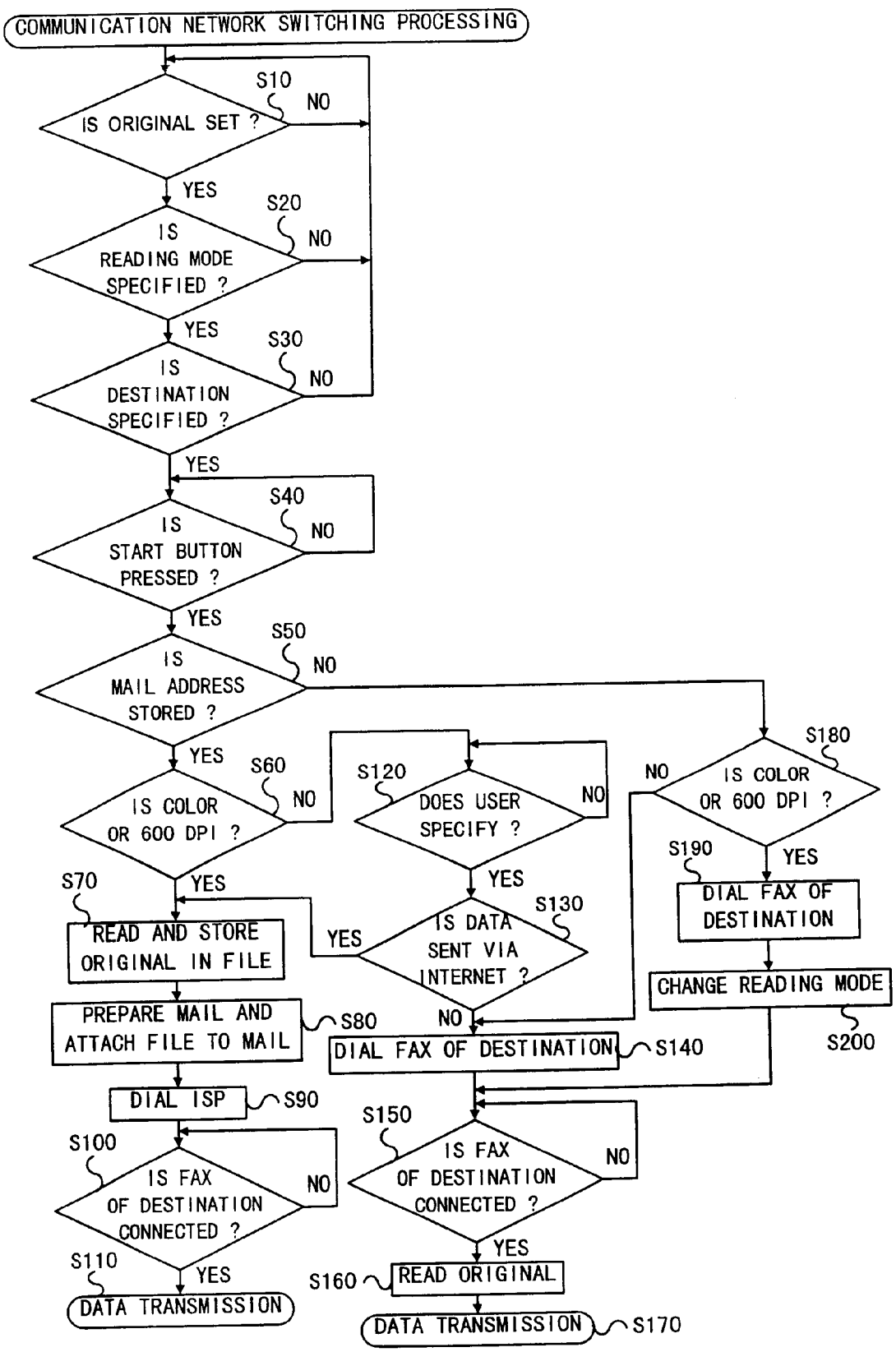
FIG. 4 is a flowchart of communication network switching processing executed by CPU 11.

FIG. 4 is a flowchart of communication network switching processing executed by CPU 11. A user of the facsimile 1 shall set the reading mode of the image scanner 19 to a reading resolution of 600 dpi and shall send read data read by the image scanner 19 to the facsimile 44. The mail address for a destination shall be stored in EEPROM 14.

First, CPU 11 detects whether an original has been set in the original setting unit 5 based upon a detection signal from the original sensor 10 in step 10, detects whether any reading mode has been set in a step 20, further detects whether any of keys 3a or the abbreviated dialing button 3d have been pressed so that a destination has been specified in step 30, and waits for the start button 3b to be pressed in step 40. Next, CPU 11 determines whether the mail address of the destination specified in step 30 is stored in step 50 when CPU 11 detects that the start button 3b has been pressed in step 40. That is, CPU 11 determines whether read data can be sent to the specified destination via the Internet.

In step 50, if the mail address of the destination is stored in EEPROM 14 (Yes in step 50), processing proceeds to step 60 and CPU 11 determines whether the reading mode specified in step 20 is a color reading mode or a reading resolution of 600 dpi. In the step 60, as the reading mode is set to reading resolution of 600 dpi, processing proceeds to step 70. In step 70, the CPU 11 instructs the image scanner 19 to read the image information of an original, stores and converts the read data to an image file in a tag image file format (TIFF). Next, CPU 11 prepares an electronic mail, attaches the above image file to the prepared electronic mail in step 80, instructs NCU 15 to dial ISP 41 in step 90 and when ISP 41 is connected in step 100, sends the electronic mail to which the above image file is attached, to ISP 41 in step 110.

The sent electronic mail is stored in ISP 42 via ISP 41 and the Internet A. The destination party can receive the electronic mail stored in ISP 42 by accessing ISP 42 using the destination facsimile 44.

If in the step 60, it is determined that the reading mode is neither a color reading mode nor a reading resolution of 600 dpi, CPU 11 waits for the user of the facsimile 1 to specify a new mail address or a new facsimile number in step 120.

That is, CPU 11 waits for an instruction to send read data via the Internet A or the public switched network B. Next, if the user instructs the CPU 11 to send read data via the Internet A in step 130, CPU 11 executes the above steps 70 to 110 and sends read data to the destination facsimile 44 via the Internet A.

If the user instructs the CPU 11 to send read data via the public switched network B in step 130, CPU 11 instructs NCU 15 to dial the destination facsimile 44 in step 140 and when the destination facsimile 44 is connected and the facsimile number is detected in step 150, an original is read in step 160 and the read data is sent to the destination facsimile 44 via the public switched network B in step 170. The read data sent is received by the destination facsimile 44 and recorded on recording paper.

If in step 50, it is determined that the mail address of the destination is not stored, it is determined in step 180 whether the reading mode is a color reading mode or the reading resolution is set to 600 dpi. If they are not set (No in step 180), the above steps 140 to 170 are executed and read data is sent to the destination facsimile 44 via the public switched network B.

In the meantime, if it is determined in step 180 that the reading mode is a color reading mode or reading resolution is set to 600 dpi, CPU 11 instructs NCU 15 to dial the destination facsimile 44 in step 190 and changes the set reading mode to G3 image format in step 200.

That is, as read data cannot be sent to the destination facsimile 44 via the public switched network in a state in which the reading mode is a color reading mode or a reading resolution set to 600 dpi, CPU 11 changes the reading mode to G3 image format which is a transmittable reading mode.

When the destination facsimile 44 is connected and the facsimile number is detected in step 150, an original is read in G3 image format in step 160 and the read data is sent to the destination facsimile 44 via the public switched network B in step 170.

As described above, if the reading mode of the facsimile 1 in this embodiment is a color reading mode or is set to a reading resolution of 600 dpi, a communication network is automatically switched such that read data can be sent to the destination facsimile 44 via the Internet A.

Therefore, labor for switching a communication network every time the reading mode is set to a color reading mode or a reading resolution of 600 dpi can be saved.

In the above embodiment, an example is described such that read data is sent via the Internet A when the reading resolution is set to 600 dpi. However, the invention is not limited to this numeric value of the reading resolution.

In the communication network switching processing in the above embodiment, after it is determined in step 50 whether the mail address is stored, it is determined whether the reading mode is a color reading mode or a reading resolution of 600 dpi. However, the reading mode may be determined before or after the determination of whether the mail address is stored.

Further, in the above embodiment, CPU 11 executes communication network switching processing shown in FIG. 4. However, PC 53 connected to the facsimile 1 may also execute the above processing. In this case, a CD-ROM and a floppy disk serve as storage mediums according to the invention to which a program for executing the communication network switching processing, shown in FIG. 4, is stored and downloaded to PC 53 as application software for the facsimile 1.

Furthermore, in the above embodiment, read data stored in an image file is attached to an electronic mail and sent. However, read data may be also sent according to a hyper text transfer protocol (HTTP) using a world wide web (WWW) technique or as the text of an Internet protocol (IP) packet, for example.

What is claimed is:

1. A facsimile apparatus, comprising:
    a reader to read image information of an original;
    a modesetter to set a reading mode of the reader;
    a transmitter to transmit the image information read by the reader via a communication network, the communication network being either of an Internet or a public switched network; and
    a switcher to switch the communication network to one of the Internet and the public switched network based on the set reading mode and for switching to the Internet when the predetermined reading mode, in which image information read by the reader cannot be transmitted according to standard facsimile procedures, is set.

2. The facsimile apparatus according to claim 1, wherein if the reading mode set by the setter is a predetermined reading mode, the switcher switches the communication network to the Internet, the predetermined reading mode being provided with a predetermined reading resolution.

3. The facsimile apparatus according to claim 1, wherein if the reading mode set by the setter is a predetermined reading mode, the switcher switches the communication network to the Internet, the predetermined reading mode being a color reading mode if the image information contains color image information.

4. The facsimile apparatus according to claim 2, wherein the transmitter transmits an electronic mail via the Internet, the electronic mail including the read image information.

5. The facsimile apparatus according to claim 4, further comprising:
    a storer to store at least one of a mail address for specifying a destination for the electronic mail to be transmitted and a facsimile number for specifying a destination for the read image information to be transmitted via the public switched network.

6. The facsimile apparatus according to claim 5, further comprising:
    a determiner to determine whether the mail address of a destination is stored in the storer if the destination is specified, wherein if the determiner determines that the mail address is stored and further, the reading mode set by the setter is the predetermined reading mode, the communication network is switched to the Internet by the switcher.

7. The facsimile apparatus according to claim 3, wherein the transmitter transmits an electronic mail via the Internet, the electronic mail including the read image information.

8. The facsimile apparatus according to claim 7, further comprising:
    a storer to store at least one of a mail address for specifying a destination for the electronic mail to be transmitted and a facsimile number for specifying a destination for the read image information to be transmitted via the public switched network.

9. The facsimile apparatus according to claim 8, further comprising:
    a determiner to determine whether the mail address of a destination is stored in the storer if the destination is specified wherein if the determiner determines that the mail address is stored and further, the reading mode set by the setter is the predetermined reading mode, the communication network is switched to the Internet by the switcher.

10. A storage medium for storing a program to operate a facsimile apparatus, the program comprising:
    a reading control program to read image information of an original;
    a setting control program to set a reading mode of the reading control program;
    a transmitting control program to transmit the image information read by the reading control program via a communication network, the communication network being either of an Internet or a public switched network; and
    a switching control program to switch the communication network to one of the Internet and the public switched network based on the set reading mode and for switching to the Internet when the predetermined reading mode, in which image information read by the reading control program cannot be transmitted according to standard facsimile procedures, is set.

11. A method for operating a facsimile apparatus, comprising:
    reading image information of an original;
    setting a reading mode for reading the image information of the original;
    transmitting the read image information via a communication network, the communication network being either of an Internet or a public switched network; and
    switching the communication network to one of the Internet and the public switched network based on the set reading mode and for switching to the Internet when the predetermined reading mode, in which image information read by the reading step cannot be transmitted according to standard facsimile procedures, is set.

12. The method according to claim 11, wherein if the set reading mode is a predetermined reading mode, the communication network is switched to the Internet, the predetermined reading mode being provided with a predetermined reading resolution.

13. The method according to claim 11, wherein if the set reading mode is a predetermined reading mode, the communication network is switched to the Internet, the predetermined reading mode being a color reading mode if the image information contains color image information.

14. The method according to claim 12, wherein the transmitting step transmits an electronic mail that includes the read image information, via the Internet.

15. The method according to claim 14, further comprising:
    storing at least one of a mail address for specifying a destination for the electronic mail to be transmitted and a facsimile number for specifying a destination for the read information to be transmitted via the public switched network.

16. The method according to claim 15, further comprising:
    determining whether the mail address of a destination is stored if the destination is specified, wherein if it is determined that the mail address is stored and further, the set reading mode is the predetermined reading mode, the communication network is switched to the Internet.

17. The method according to claim 13, wherein the transmitting step transmits an electronic mail that includes the read image information, via the Internet.

18. The method according to claim 17, further comprising:

storing at least one of a mail address for specifying a destination for the electronic mail to be transmitted and a facsimile number for specifying a destination for the read information to be transmitted via the public switched network.

19. The method according to claim 18, further comprising:

determining whether the mail address of a destination is stored if the destination is specified, wherein if it is determined that the mail address is stored and further, the set reading mode is the predetermined reading mode, the communication network is switched to the Internet.

* * * * *